United States Patent
Hidaka

(10) Patent No.: US 11,146,042 B2
(45) Date of Patent: Oct. 12, 2021

(54) SPARK PLUG INSPECTION METHOD AND SPARK PLUG MANUFACTURING METHOD

(71) Applicant: NGK SPARK PLUG CO., LTD., Nagoya (JP)

(72) Inventor: Atsutoshi Hidaka, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 119 days.

(21) Appl. No.: 16/720,682

(22) Filed: Dec. 19, 2019

(65) Prior Publication Data
US 2020/0244049 A1  Jul. 30, 2020

(30) Foreign Application Priority Data
Jan. 25, 2019  (JP) .............................. JP2019-011451

(51) Int. Cl.
| H01T 13/58 | (2020.01) |
| F02P 17/00 | (2006.01) |
| G01M 15/04 | (2006.01) |
| H01T 21/02 | (2006.01) |

(52) U.S. Cl.
CPC .............. *H01T 13/58* (2013.01); *F02P 17/00* (2013.01); *G01M 15/04* (2013.01); *H01T 21/02* (2013.01)

(58) Field of Classification Search
CPC .................................. H01T 13/58; H01T 21/02
USPC ....................................................... 73/114.62
See application file for complete search history.

(56) References Cited

U.S. PATENT DOCUMENTS

| 4,989,557 | A | * | 2/1991 | Penney | H01T 13/08 123/169 EL |
| 5,680,002 | A | * | 10/1997 | Kunitomo | H01T 13/467 313/141 |
| 6,489,709 | B1 | * | 12/2002 | Teramura | H01T 13/08 313/135 |
| 2002/0149308 | A1 | * | 10/2002 | Suzuki | H01T 13/08 313/141 |
| 2002/0157629 | A1 | * | 10/2002 | Inagaki | F02F 1/242 123/169 PA |
| 2011/0314687 | A1 | * | 12/2011 | Ozeki | H01T 21/06 33/613 |
| 2012/0274200 | A1 | * | 11/2012 | Gfell | H01T 13/08 313/141 |
| 2014/0069201 | A1 | | 3/2014 | Takahashi et al. | |
| 2019/0337067 | A1 | * | 11/2019 | Hughey | G05B 19/186 |

FOREIGN PATENT DOCUMENTS

JP      2012-238482 A      12/2012

* cited by examiner

*Primary Examiner* — Christopher M Raabe
(74) *Attorney, Agent, or Firm* — Kusner & Jaffe

(57) ABSTRACT

A spark plug inspection method and a spark plug manufacturing method that enable evaluation for the position of a ground electrode of a tapered-seat-type spark plug. The spark plug inspection method includes: a contact step of screwing an external thread of a metal shell to an internal thread of a gauge so as to bring a part of a tapered portion of the metal shell into line-contact or point-contact with an inner edge of the gauge; and a determination step of determining whether or not a ground electrode is present within a predetermined range in a circumferential direction of the gauge when the tapered portion comes into line-contact or point-contact with the inner edge of the gauge in the contact step.

3 Claims, 4 Drawing Sheets

SPARK PLUG INSPECTION METHOD AND SPARK PLUG MANUFACTURING METHOD

TECHNICAL FIELD

The present invention relates to a spark plug inspection method and a spark plug manufacturing method for a tapered-seat-type spark plug.

BACKGROUND ART

A spark plug is attached to an engine by tightening an external thread of a metal shell that insulates and retains a center electrode, to an internal thread of a plug hole formed in the engine. The spark plug attached to the engine generates a flame kernel in a spark gap between the center electrode and a ground electrode connected to the metal shell, to ignite a combustible air-fuel mixture in a combustion chamber. It is preferable that the ground electrode of the spark plug is located at such a position that does not hinder flow of the combustible air-fuel mixture, in order to grow the flame kernel. Japanese Laid-Open Patent Publication No. 2012-238482 discloses a method for inspecting the position of a ground electrode of a spark plug attached to an engine via a gasket.

SUMMARY OF THE INVENTION

Problems to be Solved by the Invention

However, the above technology has a problem that it is impossible to evaluate the position of a ground electrode of a so-called tapered-seat-type spark plug having no gasket. The present invention has been made to solve the above problem, and an object of the present invention is to provide a spark plug inspection method and a spark plug manufacturing method that enable evaluation for the position of a ground electrode of a tapered-seat-type spark plug.

Means for Solving the Problems

To achieve the above object, a spark plug inspection method according to the present invention is a spark plug inspection method for inspecting a spark plug including: a cylindrical metal shell having an external thread formed on a part of an outer circumferential surface of the metal shell, and a tapered portion provided at a rear side of the metal shell with respect to the external thread and having a diameter that increases toward a rear side, the tapered portion being configured to come into contact with an inner surface of a plug hole formed in an engine when the external thread is tightened to an internal thread of the plug hole; a center electrode insulated and retained at a center on a front side of the metal shell; and a ground electrode connected to the metal shell and forming a spark gap between the ground electrode and the center electrode. The method includes: a contact step of screwing the external thread to an internal thread of a gauge so as to bring a part of the tapered portion into line-contact or point-contact with an inner edge of the gauge; and a determination step of determining whether or not the ground electrode is present within a predetermined range in a circumferential direction of the gauge when the tapered portion comes into line-contact or point-contact with the inner edge in the contact step. A spark plug manufacturing method according to the present invention includes the above inspection method.

Effects of the Invention

In the spark plug inspection method according to the first aspect, the external thread of the metal shell is screwed to the internal thread of the gauge, and when a part of the tapered portion comes into line-contact or point-contact with the inner edge of the gauge, whether or not the ground electrode is present within a predetermined range in the circumferential direction of the gauge is determined. Thus, it is possible to evaluate the position of the ground electrode of the tapered-seat-type spark plug having the tapered portion.

In the spark plug inspection method according to the second aspect, the part of the tapered portion that comes into line-contact or point-contact with the inner edge of the gauge is located rearward of the half position of the axial-direction distance from the front end to the rear end of the tapered portion. Thus, the area of the contact area can be enlarged as compared to the case where the inner edge of the gauge comes into contact with a part frontward of the half position of the axial-direction distance from the front end to the rear end of the tapered portion. Therefore, in the contact step, a force applied to the tapered portion by the gauge can be reduced. Thus, in addition to the effects according to the first aspect, the tapered portion can be made less likely to be damaged.

The spark plug manufacturing method according to the third aspect provides the same effects as those in the first or second aspect.

DETAILED DESCRIPTION OF THE INVENTION

Figure 1:
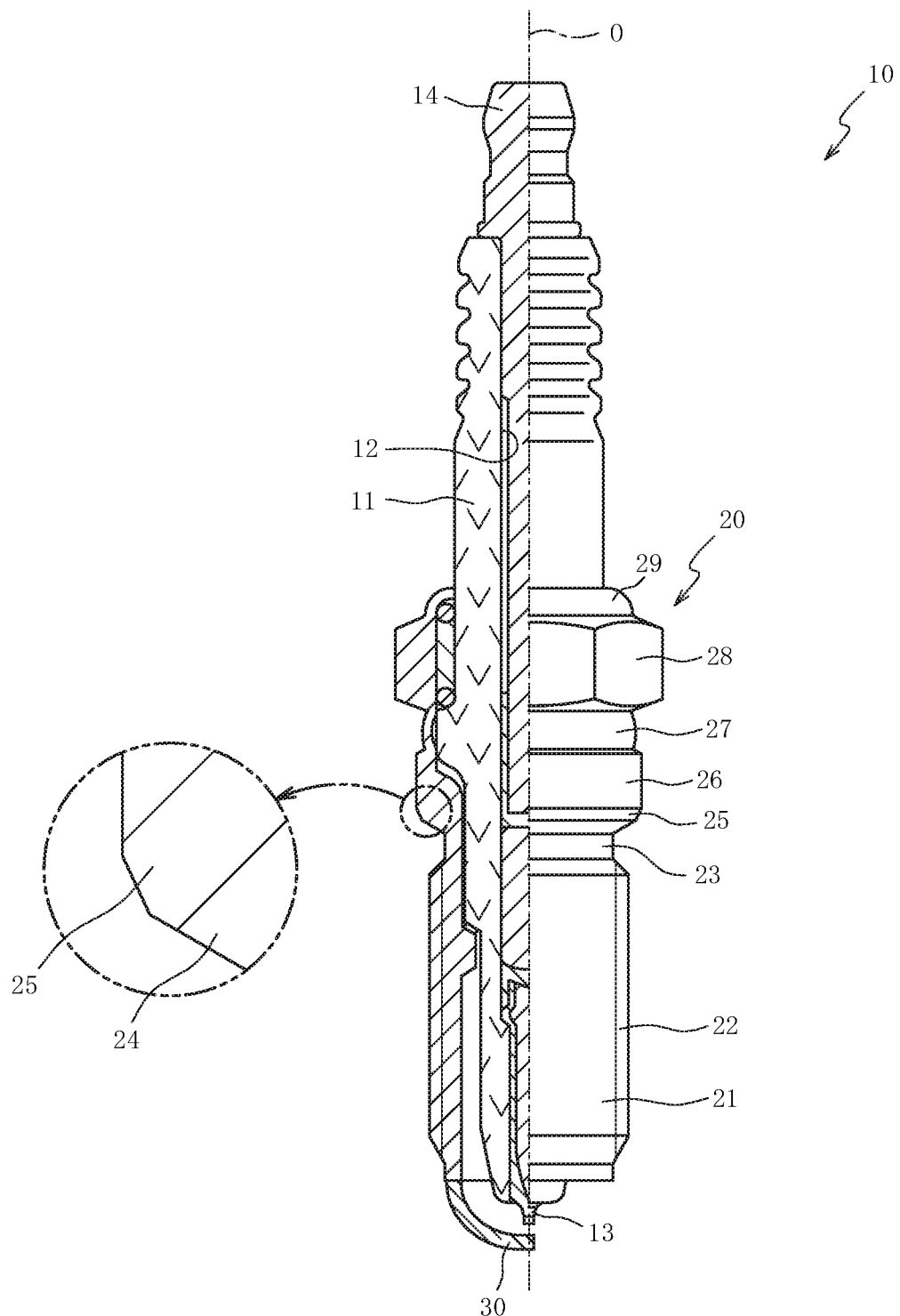
FIG. 1 is a half-sectional view of a spark plug according to an embodiment.

Hereinafter, preferred embodiments of the present invention will be described with reference to the accompanying drawings. FIG. 1 is a half-sectional view of a spark plug 10 according to an embodiment of the present invention, with an axial line O as a boundary. In FIG. 1, the lower side on the drawing sheet is referred to as a front side of the spark plug 10, and the upper side on the drawing sheet is referred to as a rear side of the spark plug 10 (the same applies in FIG. 2 and FIG. 3). As shown in FIG. 1, the spark plug 10 includes an insulator 11, a center electrode 13, a metal shell 20, and a ground electrode 30.

The insulator 11 is a member made from, for example, alumina which is excellent in mechanical property and in insulation property under high temperature, and has an axial hole 12 penetrating therethrough along the axial line O. The center electrode 13 is located at the front side of the axial hole 12.

The center electrode 13 is a bar-shaped member extending along the axial line O and is formed by coating a core material made from copper or containing copper as a main component, with a base material made from nickel or nickel-based alloy. The center electrode 13 is retained by the insulator 11 and has a front end exposed from the axial hole 12.

The metal terminal 14 is a bar-shaped member to which a high-voltage cable (not shown) is connected, and is made from a conductive metal material (e.g., low-carbon steel). The metal terminal 14 is fixed to the rear end of the insulator 11 in a state in which the front side of the metal terminal 14 is inserted into the axial hole 12. The metal terminal 14 is electrically connected to the center electrode 13 inside the axial hole 12.

With an insulation distance provided against the metal terminal 14, the metal shell 20 is fixed to the front side of the outer circumference of the insulator 11 that is separated from the rear end of the insulator 11 in the axial-line direction by a predetermined distance. The metal shell 20 is a cylindrical member made from a conductive metal material (e.g., low-carbon steel).

The metal shell 20 has a trunk portion 21, a neck portion 23, a diameter increasing portion 24, a tapered portion 25, and a seat portion 26 which are contiguous to each other, in the order from the front side to the rear side along the axial line O. An external thread 22 is formed on the outer circumferential surface of the trunk portion 21. The outer diameter of the neck portion 23 is smaller than the outer diameter of the external thread 22. The diameter increasing portion 24 is a conical part having an outer diameter that increases toward the rear side. The outer diameter of the seat portion 26 is larger than the outer diameter of the external thread 22. The tapered portion 25 is a conical part connecting the diameter increasing portion 24 and the seat portion 26, and has an outer diameter that increases toward the rear side. A taper angle of the outer circumferential surface of the tapered portion 25 with respect to the axial line O is smaller than a taper angle of the outer circumferential surface of the diameter increasing portion 24 with respect to the axial line O.

The metal shell 20 has, at the rear side of the seat portion 26, a bent portion 27, a tool engagement portion 28, and a crimp portion 29 which are contiguous to each other, in the order from the front side along the axial line O. The crimp portion 29 is a part that restricts rearward movement of the insulator 11 attached to the metal shell 20, by bending inward at the time of attachment of the metal shell 20. The tool engagement portion 28 is a part with which a tool such as a wrench is to be engaged at the time of attaching the spark plug 10 to a plug hole 41 of an engine 40 (described later). The bent portion 27 is a part that makes fixation by being plastically deformed (bent) at the time of attaching the metal shell 20 to the insulator 11 using the crimp portion 29.

The ground electrode 30 is a metal member (e.g., made of nickel-based alloy) joined to the trunk portion 21 of the metal shell 20. In the present embodiment, the ground electrode 30 is formed in a bar shape and has a front end bent to be opposed to the center electrode 13. The ground electrode 30 forms a spark gap between the ground electrode 30 and the center electrode 13.

The spark plug 10 is manufactured by the following method, for example. First, the center electrode 13 is inserted into the axial hole 12 of the insulator 11 and is located such that the front end of the center electrode 13 is exposed from the axial hole 12 to outside. The metal terminal 14 is inserted into the axial hole 12, and the metal terminal 14 and the center electrode 13 are electrically connected to each other. Thereafter, the insulator 11 is inserted into the metal shell 20 to which the ground electrode 30 has been joined in advance. Then, while the crimp portion 29 and the bent portion 27 of the metal shell 20 are plastically deformed, the metal shell 20 is attached to the outer circumference of the insulator 11. Next, the ground electrode 30 is bent so as to be opposed to the center electrode 13, whereby the spark plug 10 is obtained.

Figure 2:
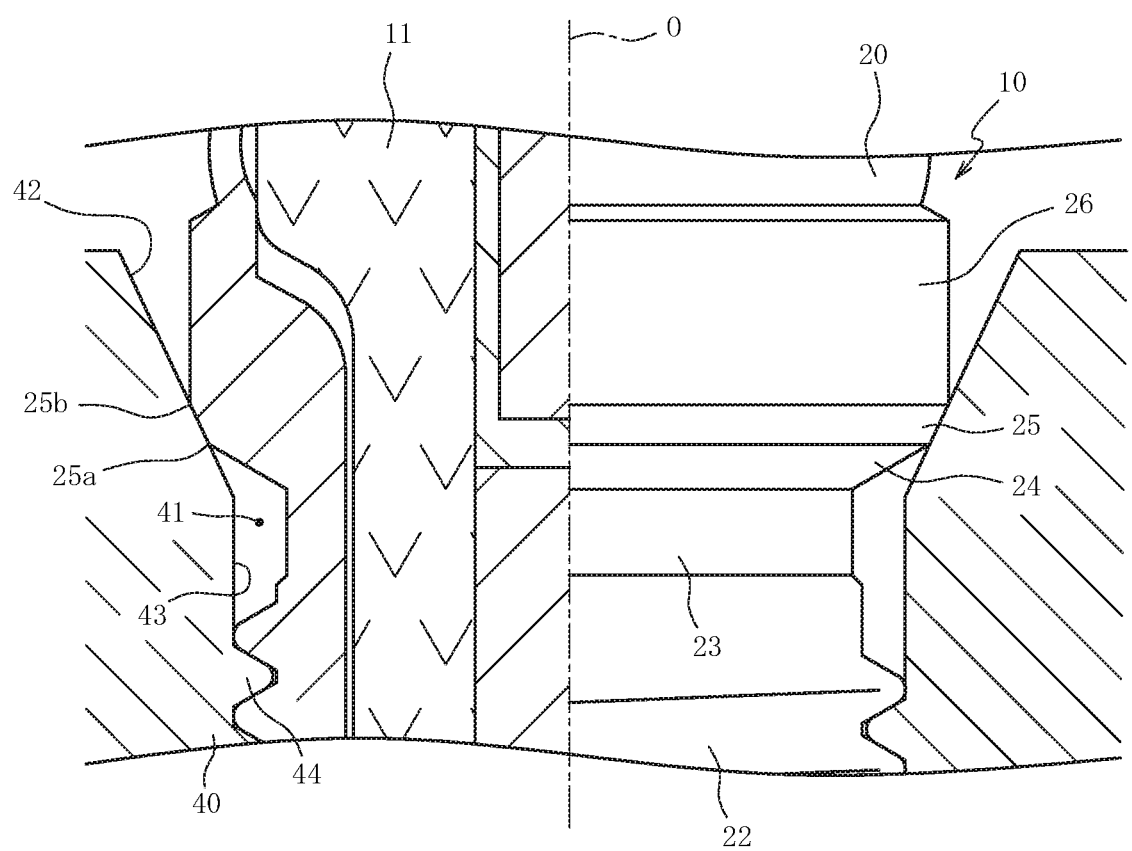
FIG. 2 is a half-sectional view of a part of the spark plug attached to an engine.

FIG. 2 is a half-sectional view of a part (vicinity of tapered portion 25) of the spark plug 10 attached to the engine 40, with the axial line O as a boundary. As shown in FIG. 2, the engine 40 has the plug hole 41 communicating with a combustion chamber (not shown). An inner surface 42 of the plug hole 41 is a conical surface having a diameter that decreases toward the combustion chamber of the engine 40. A screw hole 43 having an internal thread 44 is formed contiguously to the smallest-inner-diameter part of the inner surface 42 of the plug hole 41.

In attachment of the spark plug 10 to the engine 40, for example, first, the external thread 22 formed on the metal shell 20 of the spark plug 10 is screwed into the screw hole 43 by hand. As the external thread 22 of the metal shell 20 is screwed into the internal thread 44 of the engine 40, the metal shell 20 (trunk portion 21) advances in the axial direction while rotating about the axial line O along the helix of the thread. Along with this, the ground electrode 30 rotates about the axial line O. After the tapered portion 25 of the metal shell 20 comes into contact with the inner surface 42 of the plug hole 41, tightening is performed using a torque wrench at a prescribed tightening torque (e.g., 10 to 20 N·m). Thus, the tapered portion 25 from a front end 25$a$ to a rear end 25$b$ is pressed to the inner surface 42 of the plug hole 41 at a predetermined load, whereby airtightness is ensured.

The spark plug 10 attached to the engine 40 generates a flame kernel in the spark gap between the ground electrode 30 and the center electrode 13, to ignite a combustible air-fuel mixture in the combustion chamber (not shown). It is preferable that the ground electrode 30 of the spark plug 10 is located at such a position around the axial line O that does not hinder flow of a combustible air-fuel mixture in the combustion chamber, in order to grow the flame kernel.

The position of the ground electrode 30 around the axial line O is determined where movement of the external thread 22 in the axial direction is restricted by the tapered portion 25. Therefore, the position of the ground electrode 30 around the axial line O depends on the circumferential-direction distance between the helix of the external thread 22 and the ground electrode 30, and the axial-direction distance from the tapered portion 25 to the ridge of the external thread 22. These distances are made in the manufacturing process for the spark plug 10. The position of the ground electrode 30 around the axial line O is confirmed by a total inspection or a sampling inspection using a gauge 50 (described later) in the manufacturing process for the spark plug 10.

Figure 3:
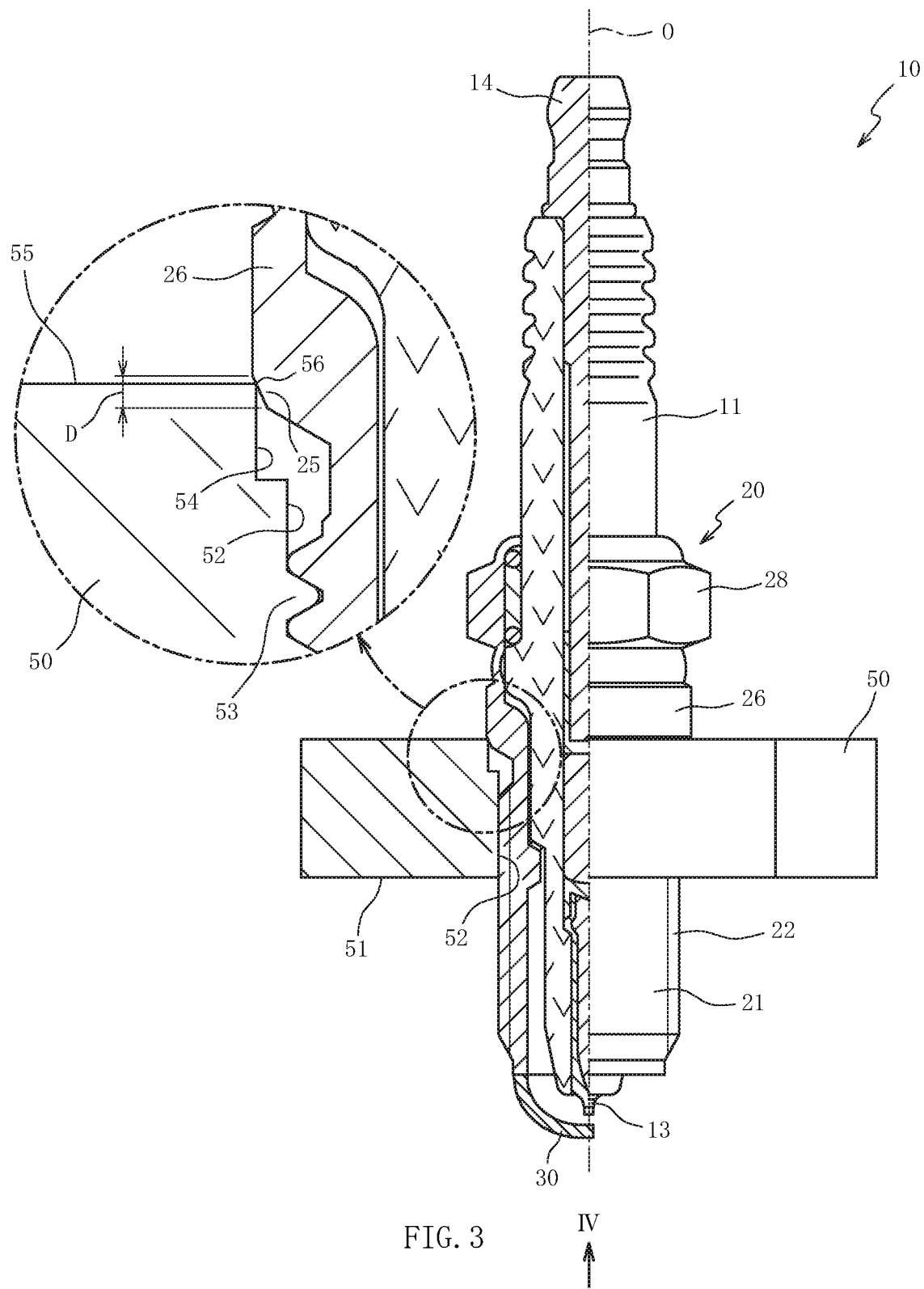
FIG. 3 is a half-sectional view of the spark plug attached to a gauge.

FIG. 3 is a half-sectional view of the spark plug 10 attached to the gauge 50, with the axial line O as a boundary. The gauge 50 is a member for confirming the position of the ground electrode 30 around the axial line O. The material of the gauge 50 is ceramic or metal harder than the metal shell 20 of the spark plug 10. In the gauge 50, a first hole 52 connected to a bottom surface 51, and a second hole 54 adjacent to the first hole 52 and connected to an upper surface 55, are formed coaxially with each other. In the present embodiment, the first hole 52 and the second hole 54 have cylindrical shapes.

The first hole 52 has an internal thread 53 to be screwed with the external thread 22 of the metal shell 20. The axial-direction length of the internal thread 53 is smaller than the axial-direction length of the external thread 22. The diameter of the second hole 54 is greater than the diameter (core diameter of internal thread 53) of the first hole 52. By the second hole 54 being provided in the upper surface 55 of the gauge 50, a round edge 56 is formed at the inner side of the gauge 50. The diameter of the edge 56 is greater than the outer diameter of the front end 25a (see FIG. 2) of the tapered portion 25, and is smaller than the outer diameter of the rear end 25b (see FIG. 2) of the tapered portion 25.

Thus, as the external thread 22 of the spark plug 10 is screwed into the internal thread 53 from the upper surface 55 side of the gauge 50, the tapered portion 25 comes into line-contact or point-contact with the inner edge 56 of the gauge 50. In the present embodiment, the position where the tapered portion 25 comes into contact with the edge 56 of the gauge 50 is located rearward of a half position of an axial-direction distance D from the front end 25a to the rear end 25b of the tapered portion 25. The position in the axial direction where the tapered portion 25 comes into contact with the edge 56 of the gauge 50 can be determined by setting of the axial-direction length of the second hole 54 and the diameter of the second hole 54. The round edge 56 can be easily formed by forming the second hole 54 in a cylindrical shape.

The line-contact of the tapered portion 25 with the inner edge 56 of the gauge 50 means that the entire circumference of the edge 56 comes into contact with the tapered portion 25, or a part of the edge 56 comes into contact therewith over a certain length. The contact of a part of the edge 56 with the tapered portion 25 over a certain length means that the circumferential-direction length of the contact part where the edge 56 comes into contact with the tapered portion 25 is greater than the axial-direction width of the contact part. In the case where the tapered portion 25 comes into line-contact with the edge 56, the axial-direction width of the contact part is not greater than 0.3 mm, for example.

The point-contact of the tapered portion 25 with the inner edge 56 of the gauge 50 means that a part of the edge 56 comes into contact with the tapered portion 25. The circumferential-direction length and the axial-direction width of the contact part (contact point) where the tapered portion 25 comes into point-contact with the edge 56 are almost equal to each other. The size of the contact point is not greater than 0.3 mm in diameter, for example.

A force at which the tapered portion 25 is pressed to the edge 56 of the gauge 50 is determined by a torque (hereinafter, referred to as "inspection torque") for tightening the external thread 22 of the spark plug 10 to the internal thread 53 of the gauge 50. The inspection torque is set to an optional value. However, in order to prevent the edge 56 of the gauge 50 from damaging the tapered portion 25, it is preferable that the inspection torque is set to be smaller than a lower limit value (e.g., 10 N·m) of a tightening torque at the time of attaching the spark plug 10 to the engine 40. As a matter of course, it is also possible that the spark plug 10 is screwed into the gauge 50 by hand or the like, and then, immediately when the tapered portion 25 comes into contact with the edge 56 of the gauge 50, the screwing is stopped, so that the inspection torque is approximately 0 N·m.

As the inspection torque increases, the circumferential-direction length of the contact part where the tapered portion 25 comes into contact with the edge 56 of the gauge 50 becomes longer. Depending on the working accuracy of the edge 56 of the gauge 50 and the tapered portion 25, the tapered portion 25 becomes more likely to come into point-contact with the edge 56 of the gauge 50 as the inspection torque decreases.

Figure 4:
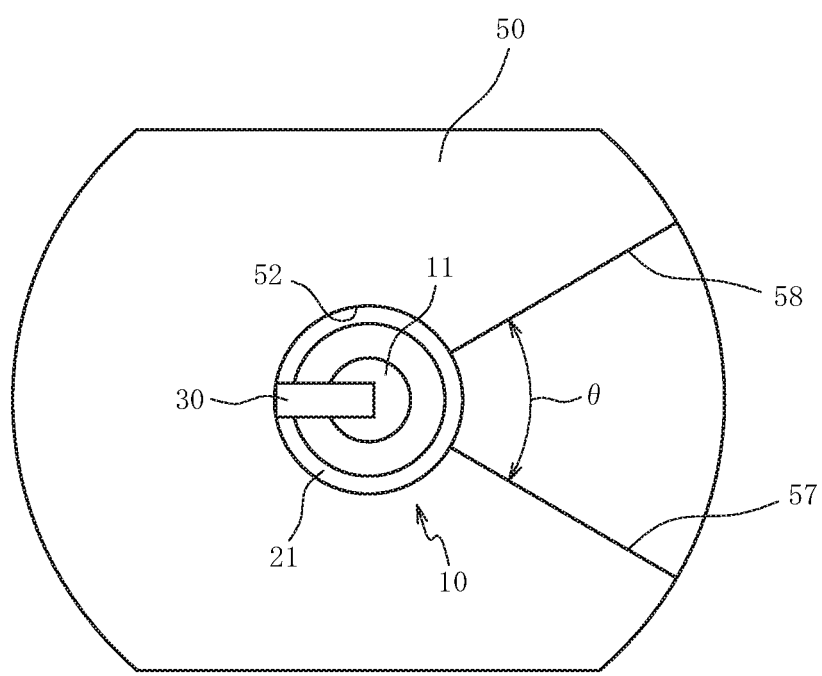
FIG. 4 is a bottom view of the gauge as seen in the direction of arrow IV in FIG. 3.

FIG. 4 is a bottom view of the gauge 50 as seen in the direction of arrow IV in FIG. 3. Indices 57, 58 around the first hole 52 are provided on the bottom surface 51 of the gauge 50. The indices 57, 58 define a range for determining whether or not the position of the ground electrode 30 is appropriate. In the present embodiment, the indices 57, 58 are lines representing the radius of a sector (central angle θ), and are engraved on the gauge 50. The inspection torque for screwing the spark plug 10 into the gauge 50 is set for each gauge 50. The positions of the indices 57, 58 are set for each gauge 50 on the basis of the relationship between the inspection torque and a prescribed tightening torque for tightening the spark plug 10 into the engine 40.

In the manufacturing process for the spark plug 10, it is determined whether or not the extending direction of the ground electrode 30 is present within the indices 57, 58 when the spark plug 10 is screwed into the gauge 50 at the predetermined inspection torque. As shown in FIG. 4, if the ground electrode 30 is present within the indices 57, 58, it is determined that the ground electrode 30 of the spark plug 10 attached to the engine 40 at the prescribed tightening torque will be located at such a position that does not hinder flow of a combustible air-fuel mixture. Thus, it is possible to evaluate the position of the ground electrode 30 of the tapered-seat-type spark plug 10 which ensures airtightness by the tapered portion 25 instead of a gasket.

The part of the tapered portion 25 that comes into line-contact or point-contact with the inner edge 56 of the gauge 50 is located rearward of the half position of the axial-direction distance D from the front end 25a to the rear end 25b of the tapered portion 25. Therefore, the area of the contact part can be enlarged as compared to the case where the inner edge 56 of the gauge 50 comes into contact with a part frontward of the half position of the axial-direction distance D. As a result, a force applied to the tapered portion 25 by the gauge 50 can be reduced, and thus the tapered portion 25 can be made less likely to be damaged.

Although the present invention has been described with reference to the embodiments, the present invention is not limited to the above embodiments at all. It can be easily understood that various modifications can be devised without departing from the gist of the present invention. The shape of the gauge 50, the axial-direction length of the internal thread 53 formed on the gauge 50, and the like may be set as appropriate.

In the above embodiment, the case where the material of the gauge 50 is ceramic or metal harder than the metal shell 20 of the spark plug 10 has been described. However, the present invention is not necessarily limited thereto. As a matter of course, for example, only the edge 56 of the gauge 50 may be made of ceramic or metal harder than the metal shell 20.

In the above embodiment, the case where the inner edge 56 of the gauge 50 has a round shape has been described. However, the present invention is not necessarily limited thereto. As a matter of course, the edge 56 may have another shape. Examples of the other shape include polygons such as a square, a rectangle, and a hexagon, an ellipse, and an oblong. Also in such a case, the tapered portion 25 can be brought into point-contact with the edge 56 of the gauge 50.

In the above embodiment, the case where the diameter increasing portion 24 having a taper angle different from the taper angle of the tapered portion 25 is adjacent to the front side of the tapered portion 25 of the metal shell 20 has been described. However, the present invention is not necessarily limited thereto. As a matter of course, the taper angle of the tapered portion 25 and the taper angle of the diameter increasing portion 24 may be set to be equal to each other so that the neck portion 23 and the seat portion 26 are connected by a conical surface. In this case, the part that comes into contact with the inner surface 42 of the plug hole 41 corresponds to the tapered portion 25.

In the above embodiment, the case where the tapered portion 25 having a conical outer circumferential surface is provided to the metal shell 20 has been described. However, the present invention is not necessarily limited thereto. As a matter of course, the tapered portion 25 having an outer circumferential surface in a spherical-zone shape may be provided.

In the above embodiment, the case where the ground electrode 30 joined to the metal shell 20 is bent has been described. However, the present invention is not necessarily limited thereto. As a matter of course, a straight-shaped ground electrode may be used instead of the bent ground electrode 30. In this case, the front side of the metal shell 20 is extended in the axial-line direction and the straight-shaped ground electrode is joined to the metal shell 20 so that the ground electrode is opposed to the center electrode 13.

In the above embodiment, the case where the straight-shaped indices 57, 58 are provided on the bottom surface 51 of the gauge 50 has been described. However, the present invention is not necessarily limited thereto. The shapes of the indices may be set as appropriate. As a matter of course, the indices may be provided by coloring. As a matter of course, the indices may be provided on the side surface of the gauge 50, instead of the bottom surface 51 of the gauge 50.

In the above embodiment, the case of determining whether or not the extending direction of the ground electrode 30 is present within the indices 57, 58 has been described. However, the present invention is not necessarily limited thereto. As a matter of course, it is also possible to determine whether or not the position where the ground electrode 30 is joined to the metal shell 20 is present within the indices by changing the positions of the indices.

What is claimed is:

1. A spark plug inspection method for inspecting a spark plug including
   a cylindrical metal shell having an external thread formed on a part of an outer circumferential surface of the metal shell, and a tapered portion provided at a rear side of the metal shell with respect to the external thread and having a diameter that increases toward a rear side, the tapered portion being configured to come into contact with an inner surface of a plug hole formed in an engine when the external thread is tightened to an internal thread of the plug hole,
   a center electrode insulated and retained at a center on a front side of the metal shell, and
   a ground electrode connected to the metal shell and forming a spark gap between the ground electrode and the center electrode, the method comprising:
      a contact step of screwing the external thread to an internal thread of a gauge so as to bring a part of the tapered portion into line-contact or point-contact with an inner edge of the gauge; and
      a determination step of determining whether or not the ground electrode is present within a predetermined range in a circumferential direction of the gauge when the tapered portion comes into line-contact or point-contact with the inner edge in the contact step.

2. The spark plug inspection method according to claim 1, wherein
   in the contact step, the part of the tapered portion that comes into line-contact or point-contact with the inner edge is located rearward of a half position of an axial-direction distance from a front end to a rear end of the tapered portion.

3. A spark plug manufacturing method comprising the spark plug inspection method according to claim 1.

* * * * *